(12) United States Patent
Hsieh

(10) Patent No.: US 7,093,364 B2
(45) Date of Patent: Aug. 22, 2006

(54) CUTTING EDGES FOR WIRE CUTTERS

(76) Inventor: Chih-Ching Hsieh, No. 367, Pei-Yang Rd., Feng Yuan, Taichung (TW)

( * ) Notice: Subject to any disclaimer, the term of this patent is extended or adjusted under 35 U.S.C. 154(b) by 0 days.

(21) Appl. No.: 10/974,875

(22) Filed: Oct. 28, 2004

(65) Prior Publication Data

US 2006/0090346 A1 May 4, 2006

(51) Int. Cl.
*B21F 13/00* (2006.01)
(52) U.S. Cl. .......................... 30/90.1; 30/91.1; 30/91.2
(58) Field of Classification Search .................. 30/90.1, 30/91.1, 91.2, 90.4, 254–262, 346.55, 346.57, 30/357; 7/107, 1
See application file for complete search history.

(56) References Cited

U.S. PATENT DOCUMENTS

| 2,090,228 | A | * | 8/1937 | Porter et al. ................. 30/252 |
| 2,112,271 | A | * | 3/1938 | Dalkowitz ..................... 139/44 |
| 2,794,250 | A | * | 6/1957 | Bethune ....................... 30/254 |
| 2,818,641 | A | * | 1/1958 | Peterson ..................... 30/91.2 |
| 4,422,240 | A | * | 12/1983 | Wallace et al. ............... 30/254 |
| 5,894,617 | A | * | 4/1999 | Liou ............................. 7/107 |
| 6,813,835 | B1 | * | 11/2004 | Deville ........................ 30/254 |

* cited by examiner

*Primary Examiner*—Allan N. Shoap
*Assistant Examiner*—Omar Flores Sanchez

(57) ABSTRACT

A wire cutter includes two jaws pivotably connected with each other and each jaw has a curve cutting edge which includes a cutting portion which includes a first section, a second section and a third section which is located between the first and second sections. Each of the first section and the second section has a first side surface and a second side surface, and a first angle of 60 degrees is defined between the first side surface and the second side surface. The third section has a third side surface and a fourth side surface, a second angle of 35 degrees is defined between the third side surface and the fourth side surface. The wires are pushed toward the second sections and cut by the second sections.

4 Claims, 7 Drawing Sheets

CUTTING EDGES FOR WIRE CUTTERS

FIELD OF THE INVENTION

The present invention relates to a wire cutter wherein the cutting edge includes three cutting sections with different tilt angles.

BACKGROUND OF THE INVENTION

A conventional wire cutter includes two jaws connected to two handles which are pivotably connected with each other such that the two jaws can be separated by pivoting the two handles apart, and be moved toward each other to cut the wires between the two jaws by closing the two handles together. Generally, the cutting edge for cutting the wires of each jaw is designed to be a curve cutting edge so as to cut a bundle of wires which includes plastic sheath and metal core wire. Nevertheless, during cutting, the wires are pushed toward two ends of the cutting edges because of the movement of the two jaws and the two handles are maintained to be opened wide. Therefore, the user has to open his hand to push the two handles toward each other to cut the wires. Besides, the cutting edge has a fixed curvature and tilt angle which cannot reinforce the efficiency of cutting and requires a lot of efforts to cut the wires.

The present invention intends to provide cutting edges for wire cutters wherein the cutting edge includes three sections and the middle section has a sharp tilt angle and wires are pushed toward the middle sections which can efficiently cut the wires.

SUMMARY OF THE INVENTION

The present invention relates to wire cutter that comprises two handles and two jaws are connected to two handles respectively. The two jaws are pivotably connected with each other and each jaw includes a curve cutting edge which includes a cutting portion which includes a first section, a second section and a third section which is located between the first and second sections. Each of the first section and the second section has a first side surface and a second side surface. A first angle is defined between the first side surface and the second side surface. The third section has a third side surface and a fourth side surface, and a second angle is defined between the third side surface and the fourth side surface. The second angle is smaller than the first angle.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
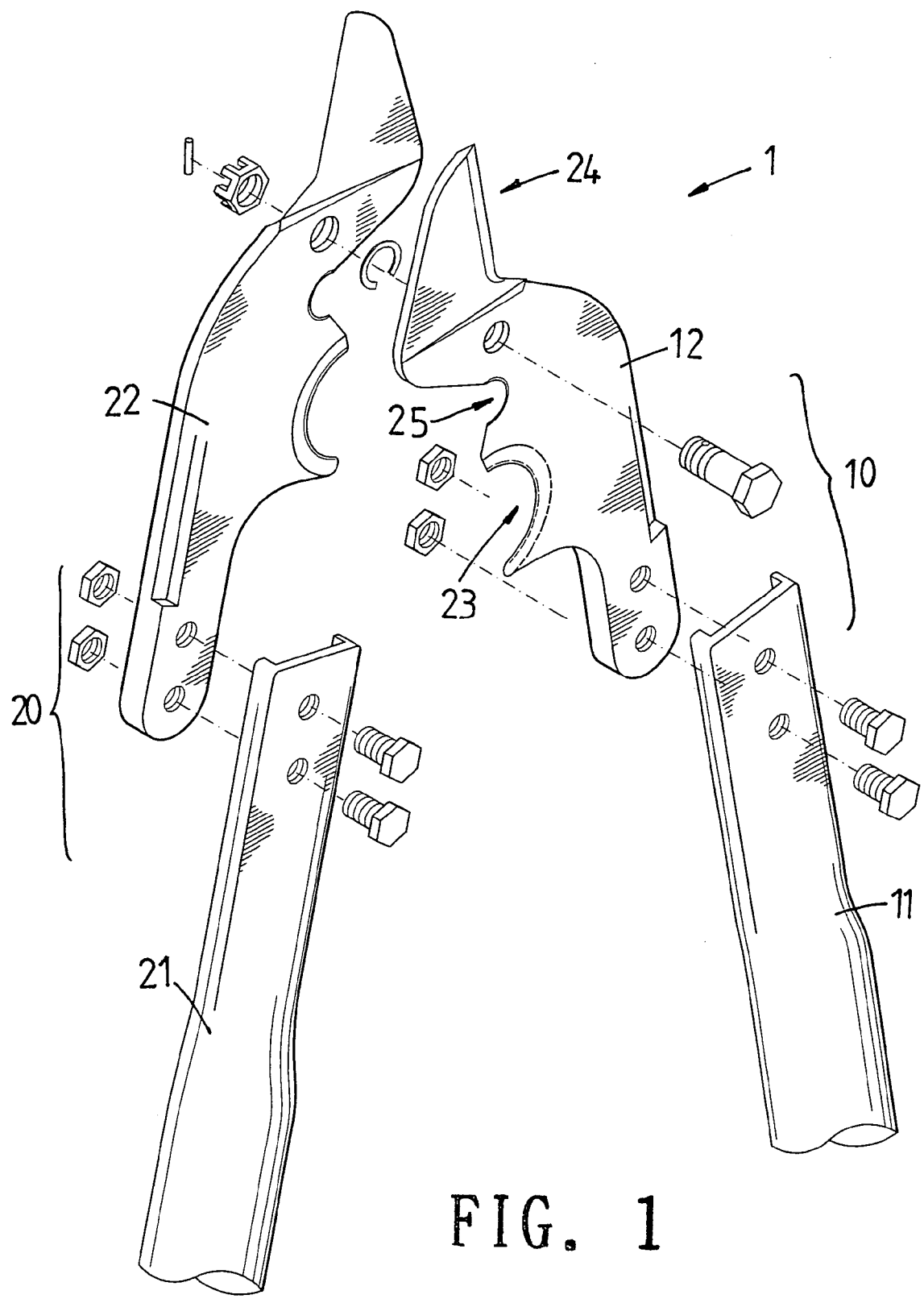
FIG. 1 is an exploded view to show the wire cutter of the present invention.
Figure 2:
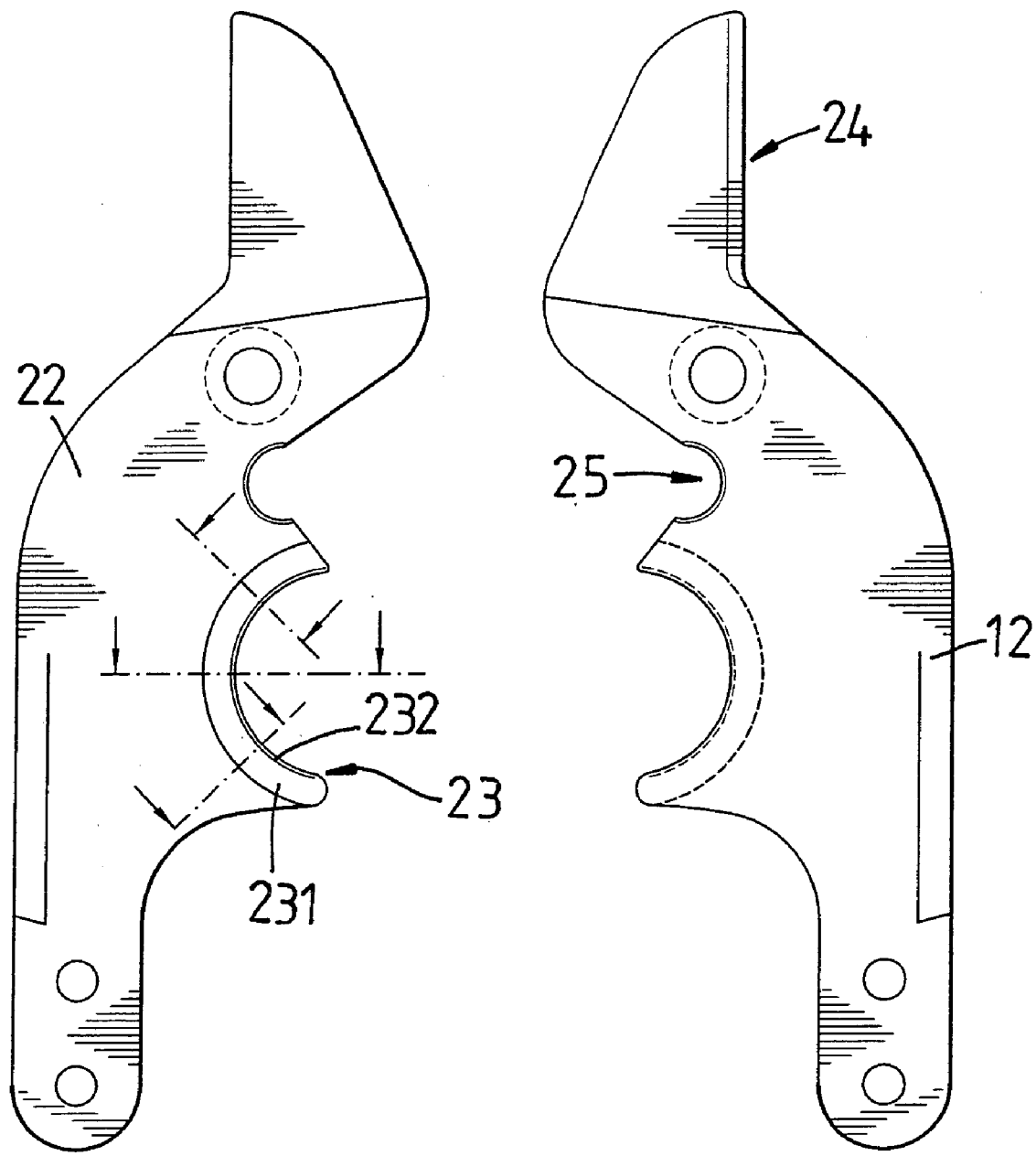
FIG. 2 shows a plane view of the two jaws of the wire cutter of the present invention.
Figure 3A:
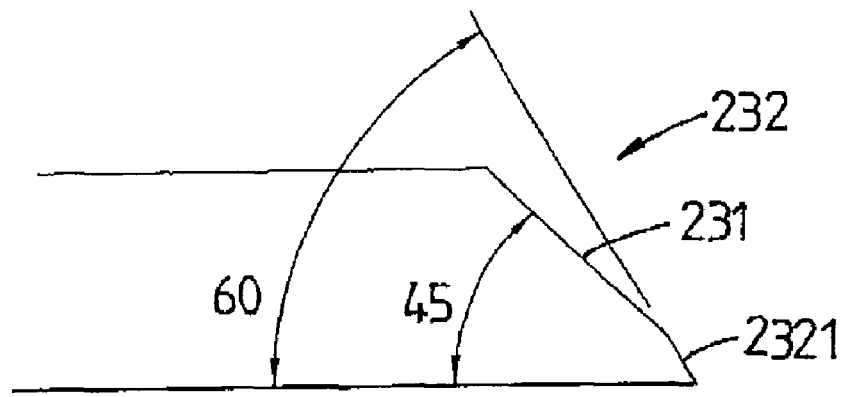
FIG. 3A shows the cross section of the first section of the cutting edge.
Figure 3B:
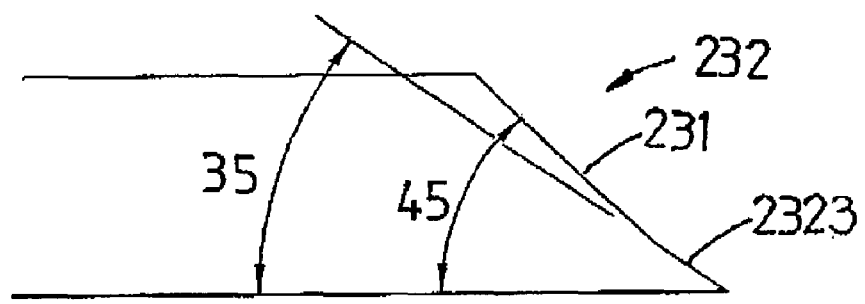
FIG. 3B shows the cross section of the third section of the cutting edge.
Figure 3C:
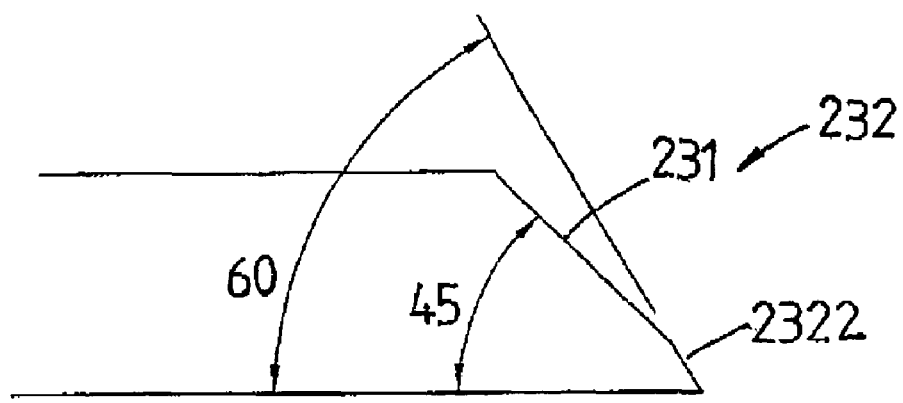
FIG. 3C shows the cross section of the second section of the cutting edge.
Figure 4:
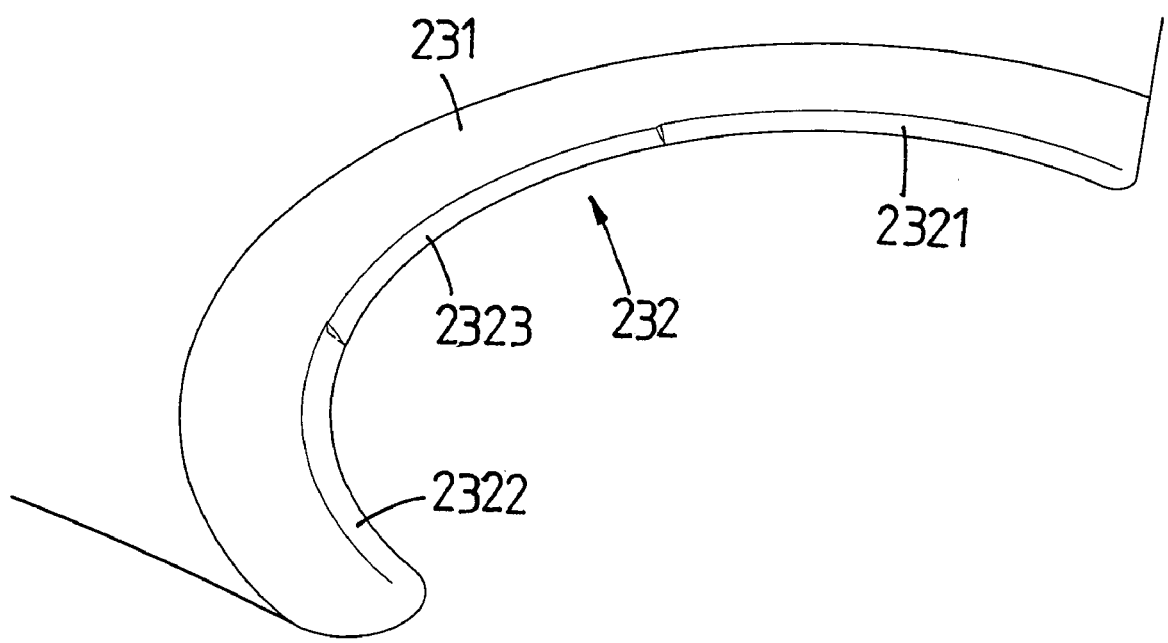
FIG. 4 shows an enlarged view of the cutting edge.
Figure 5:
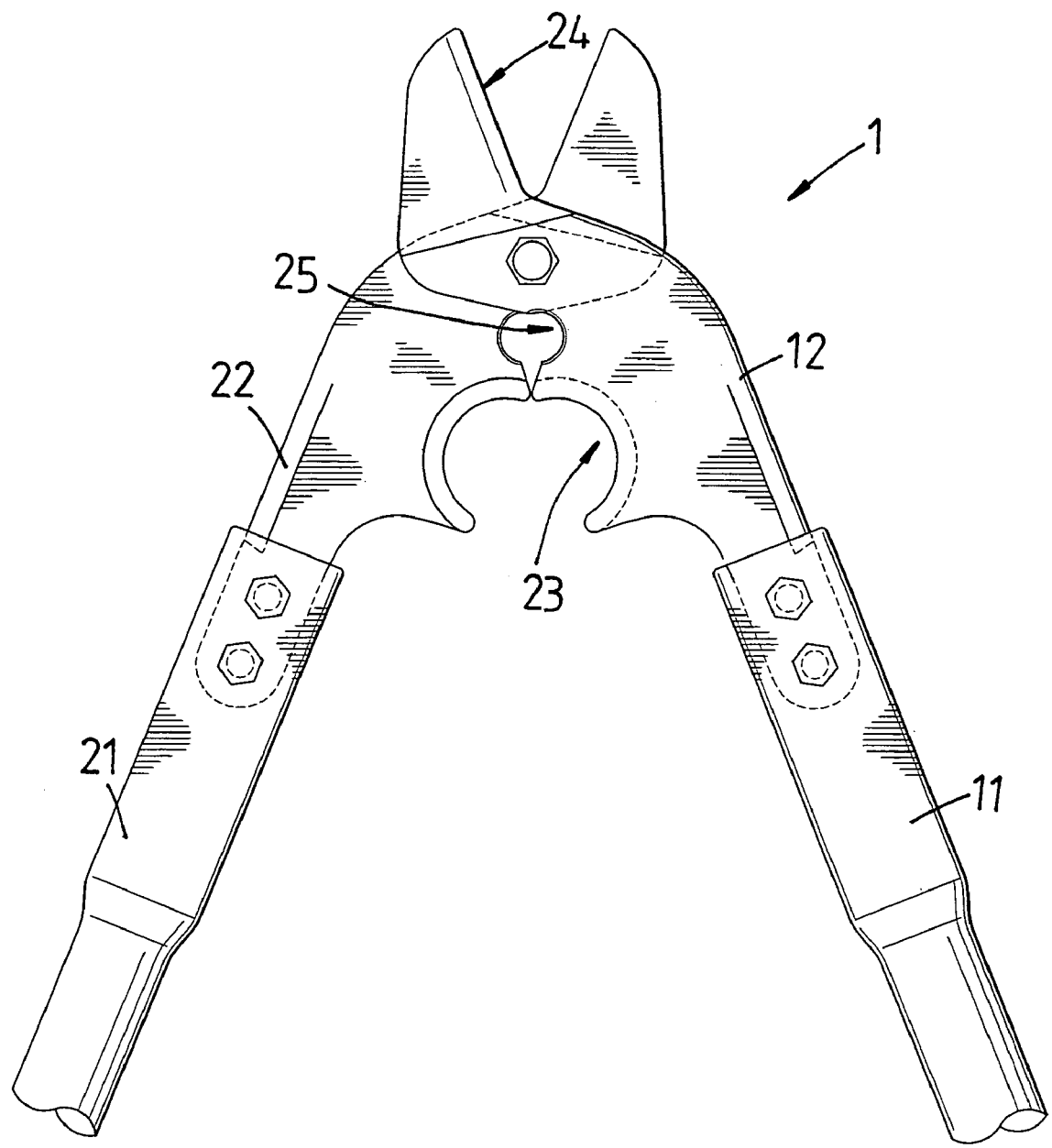
FIG. 5 shows that the two jaws are opened wide.

Referring to FIGS. 1, 2, 3A, 3B, 3C, 4 and 5, the wire cutter of the present invention is composed of two halves 10, 20 and each half 10/20 comprises a handle 11/21 and a jaw 12/22 connected to the handles 11/21 corresponding thereto. The two jaws 12, 22 are pivotably connected with each other by a bolt or a rivet such that when the two handles 11, 21 are opened wide, the two jaws 12, 22 are opened wide.

Each jaw 12/22 includes a straight cutting edge 24, a peeling edge 25 and a curve cutting edge 23 which includes a base portion 231 and a cutting portion 232 which is connected to the base portion 231. The cutting portion 232 includes a first section 2321, a second section 2322 and a third section 2323 which is located between the first and second sections 2321, 2322.

Each of the first section 2321 and the second section 2322 has a first side surface and a second side surface. A first angle of 60 degrees is defined between the first side surface and the second side surface. The third section has a third side surface and a fourth side surface, and a second angle of 35 degrees is defined between the third side surface and the fourth side surface. The base portion 231 includes a fifth side surface and a sixth side surface which is connected to the first side surface and the third side surface. A third angle 45 degrees is defined between the fifth side surface and the sixth side surface.

Figure 6:
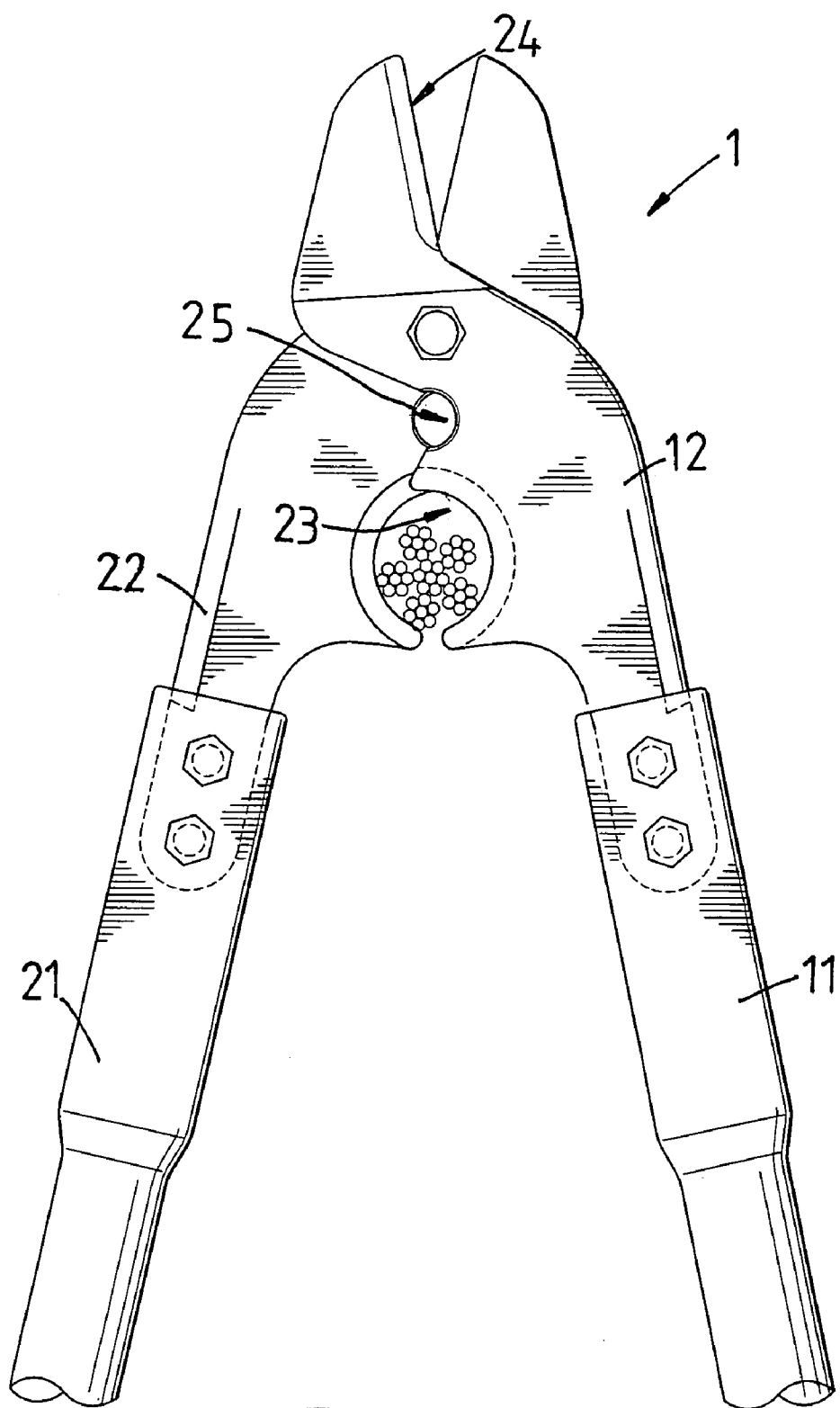
FIG. 6 shows that the wires are located between the two curve cutting edges.
Figure 7:
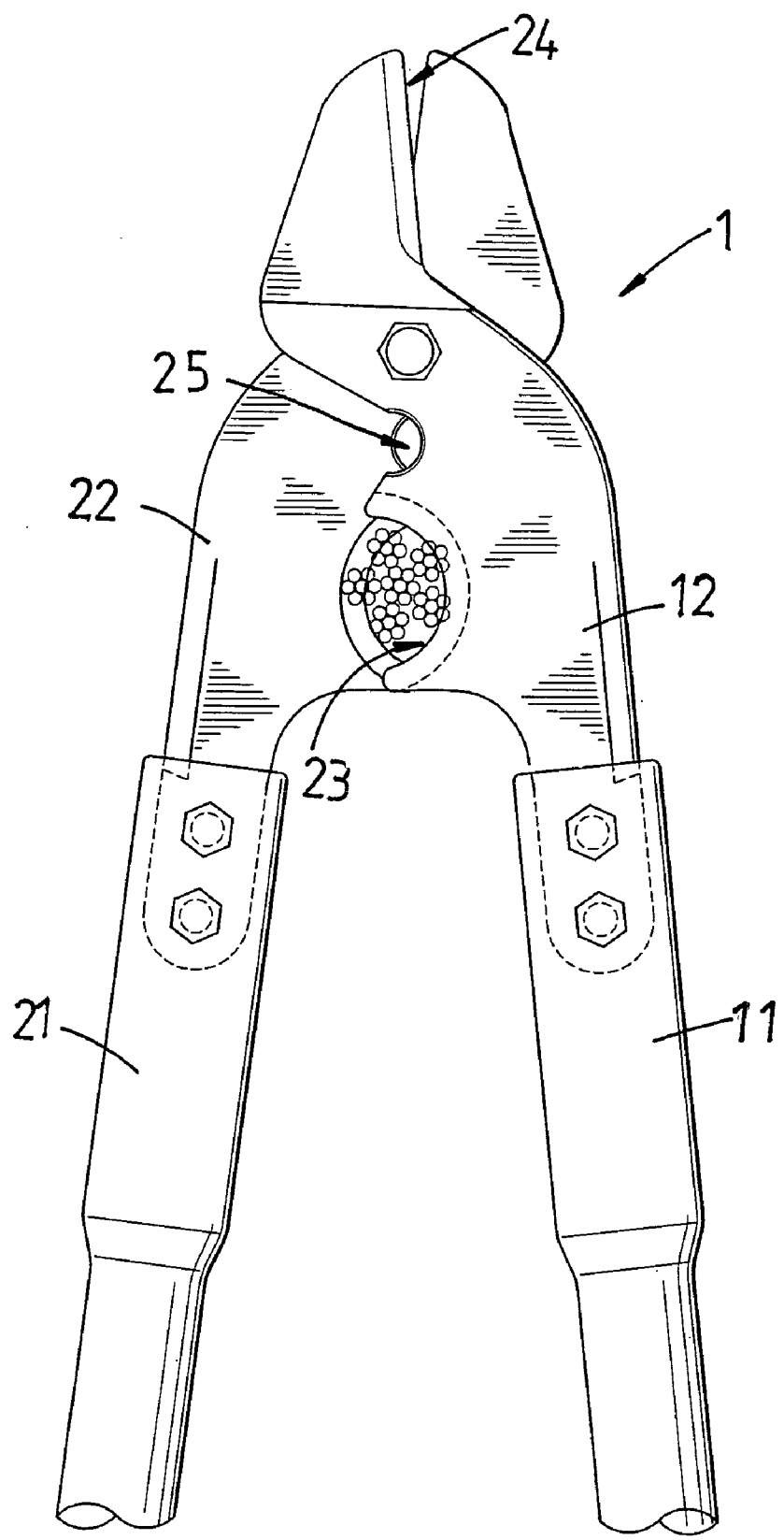
FIG. 7 shows that the wires are cut by the wire cutter of the present invention.

As shown in FIGS. 6 and 7, a bundle of wires are put between the two curve cutting edges 23 and the two handles 11, 21 are pivoted toward each other. The first and second sections 2321, 2322 with larger first angle push the wires toward the third sections 2323 which has a sharp second angle which easily cuts the wires.

While we have shown and described the embodiment in accordance with the present invention, it should be clear to those skilled in the art that further embodiments may be made without departing from the scope of the present invention.

What is claimed is:

1. A wire cutter comprising:

two handles and two jaws connected to two handles respectively, the two jaws pivotably connected with each other, each jaw including a curve cutting edge which includes a base portion and a cutting portion which is connected to the base portion, the cutting portion including a first section, a second section and a third section which is located between the first and second sections, each of the first section and the second section having a first side surface and a second side surface, a first angle defined between the first side surface and the second side surface, the third section having a third side surface and a fourth side surface, a second angle defined between the third side surface and the fourth side surface, the second angle being smaller than the first angle.

2. The wire cutter as claimed in claim 1, wherein the first angle is 60 degrees and the second angle is 35 degrees.

3. The wire cutter as claimed in claim 1, wherein the base portion includes a fifth side surface and a sixth side surface which is connected to the first side surface and the third side surface, a third angle defined between the fifth side surface and the sixth side surface and the third angle being 45 degrees.

4. The wire cutter as claimed in claim 1, wherein the two jaws each include a straight cutting portion.

* * * * *